United States Patent [19]

Gregg

[11] 3,860,302

[45] Jan. 14, 1975

[54] BALL BEARING ASSEMBLY

[76] Inventor: Woodrow W. Gregg, 181 Long Hill Rd., Little Falls, N.J. 07424

[22] Filed: June 29, 1973

[21] Appl. No.: 375,129

[52] U.S. Cl. .............................................. 308/187
[51] Int. Cl. ............................................. F16c 1/24
[58] Field of Search .......................... 308/187, 187.2

[56] References Cited
FOREIGN PATENTS OR APPLICATIONS
907,144   10/1962   Great Britain ...................... 308/187

Primary Examiner—M. Henson Wood, Jr.
Assistant Examiner—Richard A. Bertsch
Attorney, Agent, or Firm—Berman, Bishoff & Platt

[57] ABSTRACT

A ball bearing assembly of the type having a ball spacer holding the balls circumferentially spaced between inner and outer raceway bodies, with sealing rings at the outer rim portions of the raceway bodies to retain lubricant around the balls. Lubricant stabilizing clips are mounted on the ball spacer, the clips having beveled arms to urge the lubricant toward the bearing balls and raceway grooves and to retard rotation of the ball spacer, which thereby reduces agitation of the lubricant and reduces leakage through the sealing rings.

15 Claims, 7 Drawing Figures

PATENTED JAN 14 1975  3,860,302
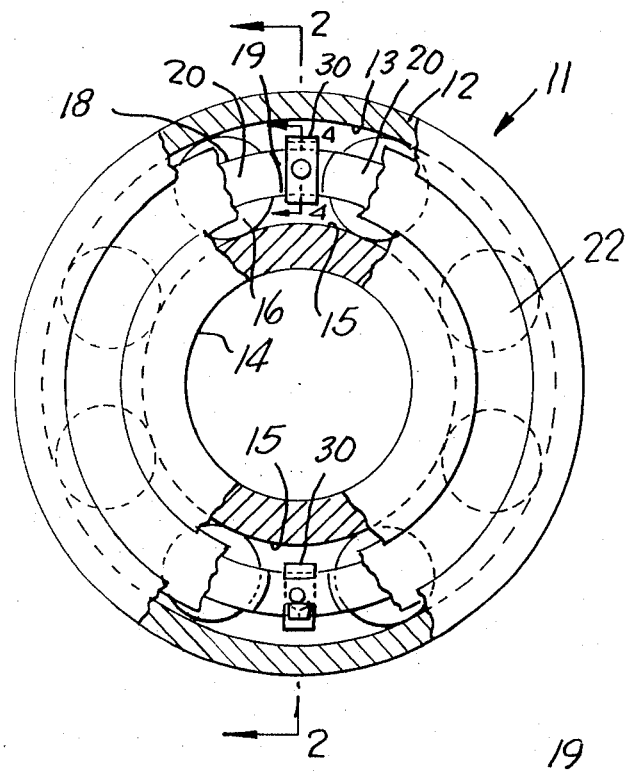
FIG. 1.
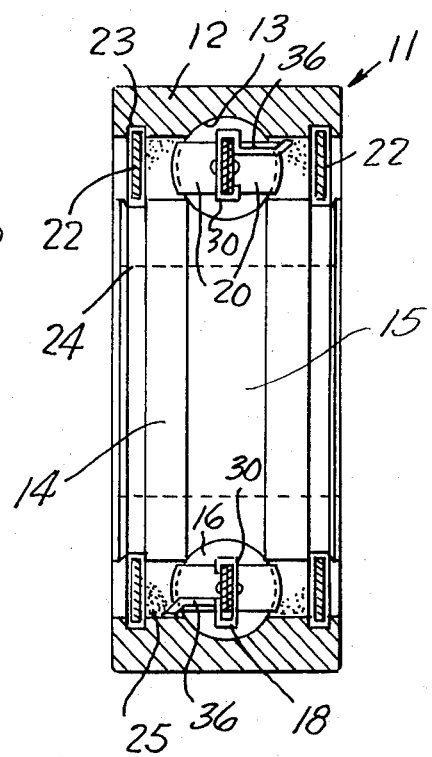
FIG. 2.
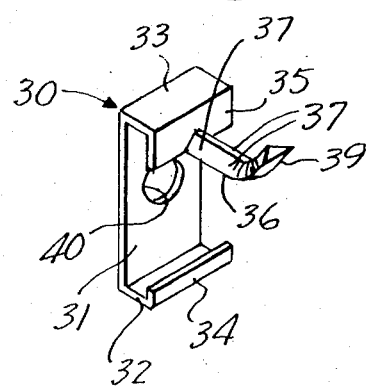
FIG. 3.
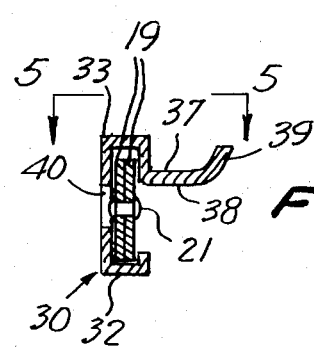
FIG. 4.
FIG. 5.
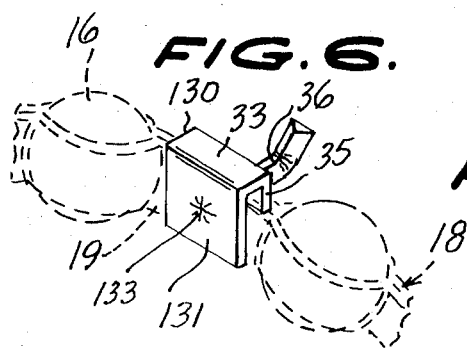
FIG. 6.
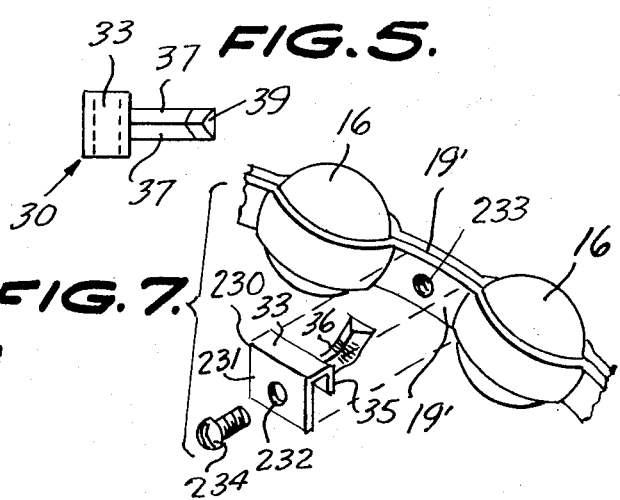
FIG. 7.

3,860,302

BALL BEARING ASSEMBLY

This invention relates to bearing assemblies, and more particularly to ball bearing assemblies of the type provided with means for directing lubricant toward the bearing balls of the assembly.

A main object of the invention is to provide a novel and improved ball bearing assembly having means to insure lubrication of its rotary bearing elements, the assembly involving relatively simple components, operating to reduce wear on the moving parts thereof, and having means therein for minimizing leakage of lubricant from the bearing assembly.

A further object of the invention is to provide an improved ball bearing assembly which incorporates means for retarding movement of its ball spacer member while at the same time urging lubricant toward the bearing balls and raceway surfaces of the assembly and operating to minimize the temperature rise of the lubricant by preventing excessive agitation thereof, thereby minimizing leakage of the lubricant from the bearing assembly, the assembly comprising relatively inexpensive components, being easy to put together and acting to retain lubricant therein whereby to minimize wear and to insure smooth operation of the assembly.

A still further object of the invention is to provide an improved lubricant stabilizing clip for use with a ball bearing assembly of the type having balls circumferentially spaced apart by a ball spacer element, the clip being easy to mount on the ball spacer element and acting to provide proper distribution of the lubricant in the assembly as well as to retard rotation of the spacer member and minimize agitation of the lubricant.

Further objects and advantages of the invention will become apparent from the following description and claims, and from the accompanying drawings wherein:

FIG. 1 is an elevational view, partly in cross-section, of an improved ball bearing assembly constructed in accordance with the present invention.

FIG. 2 is a transverse vertical cross-sectional view taken substantially on line 2—2 of FIG. 1.

FIG. 3 is an enlarged perspective view of a lubricant stabilizing clip employed in the ball bearing assembly of FIGS. 1 and 2.

FIG. 4 is an enlarged transverse vertical cross-sectional view taken substantially on line 4—4 of FIG. 1.

FIG. 5 is a top plan view of the clip, taken substantially on line 5—5 of FIG. 4.

FIG. 6 is a perspective view showing a modified form of lubricant stabilizing clip.

FIG. 7 is a perspective view showing another modified form of lubricant stabilizing clip.

Referring to the drawings, 11 generally designates an improved ball bearing assembly constructed in accordance with the present invention. The ball bearing assembly 11 comprises an annular outer raceway body 12 formed with an inwardly facing annular raceway groove 13, an inner annular raceway body 14 formed with an outwardly facing annular raceway groove 15, a plurality of bearing balls 16 having their outer and inner portions respectively rotatably received in the grooves 13 and 15, and a ball spacer member 18 for holding the balls 16 circumferentially spaced between the inner and outer raceway bodies 12 and 14.

The ball spacer member 18 is of generally annular shape and comprises a pair of cooperating band members 19, 19 formed with opposite arcuate portions 20, 20 shaped to conformably receive the bearing balls 16 therebetween and to allow the balls to rotate freely, the flat portions of the bands 19 being secured together by rivets 21, as shown in FIG. 4.

Flat annular sealing rings 22, 22 are seated in opposing sets of annular grooves 23, 24 formed in the raceway bodies 12 and 14 adjacent the opposite sides of the bearing assembly, as shown in FIG. 2. The assembly includes a quantity of lubricant 25, such as grease, oil or the like, the inner and outer edge portions of the rings 22, 22 being relatively closely received in the grooves 23 and 24 so as to substantially retain the lubricant 25 in the assembly.

It has been found in conventional ball bearing assemblies of the type having the components above-described, that the ball spacer assembly 18 rotates relatively rapidly along with the bearing balls, following the relative rotation of the outer and inner raceway bodies 12 and 14, which tends to excessively agitate the lubricant 25 and raises its temperature, thereby causing it to leak past the sealing rings 22. In accordance with the present invention, a plurality of lubricant stabilizing clips are mounted on the flat connected portions of the cooperating members 19, 19 of the ball spacer member 18, the clips being provided with outwardly projecting control arms which act as propelling means to direct the lubricant toward the bearing balls 16 and the inner and outer opposing raceway bearing surfaces 13 and 15, as well as to retard the rotational movement of the ball spacer member 18 to thereby reduce the agitation of the lubricant 25. Such clip members are shown at 30, and a pair of said clip members may be employed spaced 180° apart on the ball spacer member 18 in the manner illustrated in FIGS. 1 and 2.

Referring now to FIGS. 3, 4 and 5, each clip member comprises a spring metal main body 31 having a bottom flange 32 and a top flange 33, the bottom flange 32 being provided with an upstanding lip 34 and the top flange 33 being provided with a depending lip 35 of substantially greater height than the upstanding bottom lip 34. Rigidly secured to the central portion of the depending member 35 is an outwardly projecting arm 36 of generally triangular cross-sectional shape having the opposite upper beveled portions 37, 37 and having the flat downwardly facing bottom surface 38. The arm 37 is curved upwardly at its outer end portion, as viewed in FIGS. 3 and 4, and as shown at 39. The main body 31 is provided with a central aperture 40 adapted to receive the head of a rivet 21 therein in the manner illustrated in FIG. 4.

The clips 30 can be readily mounted on the ball spacer member 18 at the flat abutting portions 19, 19 thereof by engaging the top channel element of the clip, defined by members 31, 33 and 35, respectively, over the top edges of the spacer elements 19, 19 and then pushing downwardly on the flange 33 to cause the bottom flange 32 and lip 34 to slip past the bottom edges of the spacer members 19, 19 and snap into the position thereof shown in FIG. 4, whereby the left rivet head, as viewed in FIG. 4, is received in the aperture 40. A clip 30 is thus mounted on the spacer member 18 at diametrically opposed locations thereon, with the arms 36 thereof oppositely directed, as shown in FIG. 2. Thus, the beveled surface portions 37, 37 are properly oriented to urge lubricant toward the bearing balls 16 and toward the raceway bearing surfaces 15 and 13 responsive to the rotation of the spacer member 18. Furthermore, the inclined outer portions 39 of the arms 36, as well as the remaining portions of said arms, act to retard the rotation of the ball spacer member 18 and to thereby reduce the agitation of the lubricant and to prevent said lubricant from rising excessively in temperature. This, in turn, minimizes the leakage of lubricant past the sealing rings 22.

It will be noted that the inclined arms 39 are directed outwardly in the cavities containing the lubricant 25 and the inclinations of the arms are such that the beveled surfaces 37 act as vane surfaces to propel lubricant inwardly toward the balls 16 and raceway grooves 15, 13 responsive to the rotation of the ball spacer member 18 relative to the outer raceway body member 12.

In the modification shown in FIG. 6, the clip, shown at 130, has a flat main body portion 131 which is spot-welded at 133 to the flat abutting portions 19, 19 with its top channel element engaged over the top edges of the spacer elements 19, 19 and its arm 36 extending laterally in the same manner as shown in FIG. 4. Such clips 130 may be provided at diametrically opposite locations on the spacer member 18 as in the previously described form of the invention.

In the modification shown in FIG. 7, the clip, shown at 230 has a flat main body portion 231 formed with an aperture 232, and the flat abutting portions 19', 19' of the spacers have tapped openings 233 registrable with aperture 232 when the top channel element of the clip is engaged over the top edges of the spacer elements 19', 19'. A fastening screw 234 is engaged through aperture 232 and threaded through tapped openings 233 to lock the clip in place. Such clips 230 may be provided at diametrically opposite locations on the ball spacer member as in the previously described forms of the invention.

While a specific embodiment of an improved bearing assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A bearing assembly comprising an outer raceway body having an inwardly facing annular raceway groove, an inner raceway body concentrically disposed in said outer body and having an outwardly spacing annular raceway groove, a plurality of rotatable bearing elements in said groove, a spacer member concentrically disposed between the bodies and having circumferentially spaced holding means surrounding the bearing elements and holding them in circumferentially spaced relationship, annular sealing elements between the bodies on opposite sides of the spacer member, lubricating material in the space defined between said sealing elements, and at least one arm mounted on the spacer member defining a lateral projection engaged with said lubricating material and retarding rotation of said spacer member relative to the bodies.

2. The bearing assembly of claim 1, and wherein said arm has a bent outer end portion.

3. The bearing assembly of claim 2 and wherein said arm has a longitudinal surface which is inclined relative to a plane perpendicular to the axis of the bodies.

4. The bearing assembly of claim 2, and wherein said arm has outwardly convergent longitudinal surfaces inclined in opposite directions relative to a plane perpendicular to the axis of the bodies.

5. The bearing assembly of claim 2, and wherein at least said bent outer end portion of said arm has a triangular cross section.

6. A bearing assembly comprising an outer raceway body having an inwardly facing annular raceway groove, an inner raceway body concentrically disposed in said outer body and having an outwardly spacing annular raceway groove, a plurality of rotatable bearing elements in said groove, a spacer member concentrically disposed between the bodies and having circumferentially spaced holding means surrounding the bearing elements and holding them in circumferentially spaced relationship, annular sealing elements between the bodies on opposite sides of the spacer member, lubricating material in the space defined between said sealing elements, and a clip member mounted on the spacer member and being formed with a lateral projecting arm engaged with said lubricating material and retarding rotation of said spacer member relative to the bodies.

7. The bearing assembly of claim 6, and wherein said clip member has a main body portion received between a pair of adjacent holding means, and means rigidly securing said main body portion of the clip to the spacer member between said adjacent holding means.

8. The bearing assembly of claim 6, and wherein said clip member is mounted on the spacer member between a pair of adjacent holding means.

9. The bearing assembly of claim 8, and wherein said clip member is of resilient material and has opposing top and bottom channel elements lockingly engaged with opposite edge portions of said spacer member.

10. the bearing assembly of claim 9, and wherein said laterally projecting arm is formed on the top channel element of the clip member.

11. The bearing assembly of claim 10, and wherein said arm is triangular in cross-section, with outwardly convergent top surfaces.

12. The bearing assembly of claim 11, and wherein the outer end portion of the arm is outwardly inclined relative to the main portion of the arm.

13. The bearing assembly of claim 12, and wherein the spacer member has a projection between said pairs of adjacent holding means and said clip member has an aperture lockingly receiving said projection.

14. The bearing assembly of claim 5, and wherein the securing means comprises a weld.

15. The bearing assembly of claim 5, and wherein the securing means comprises a fastening screw connecting said main body portion and the spacer member.

* * * * *